Aug. 10, 1948.                H. C. SWEETEN                2,446,965
                        ANGLE DRIVE FOR SHAKER CONVEYERS
Filed July 13, 1946                                    2 Sheets-Sheet 1
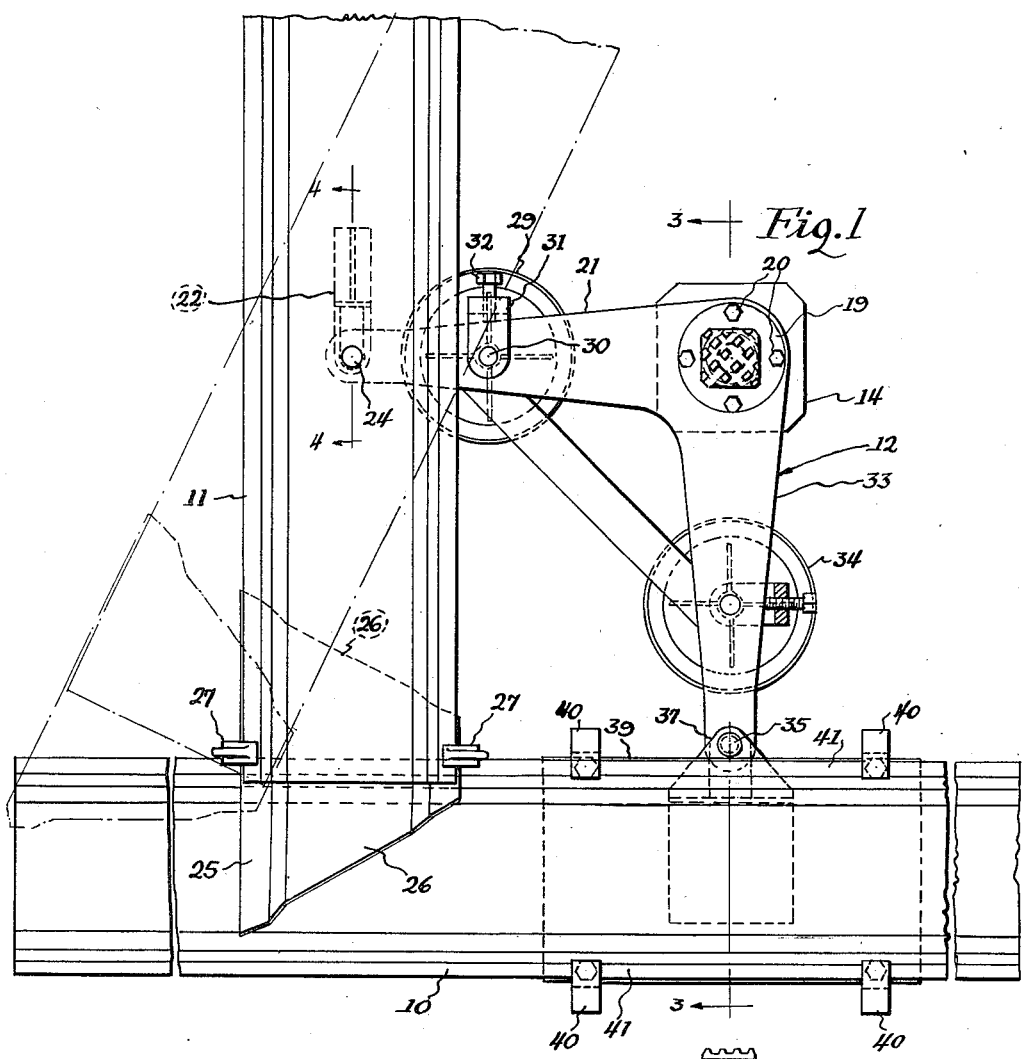
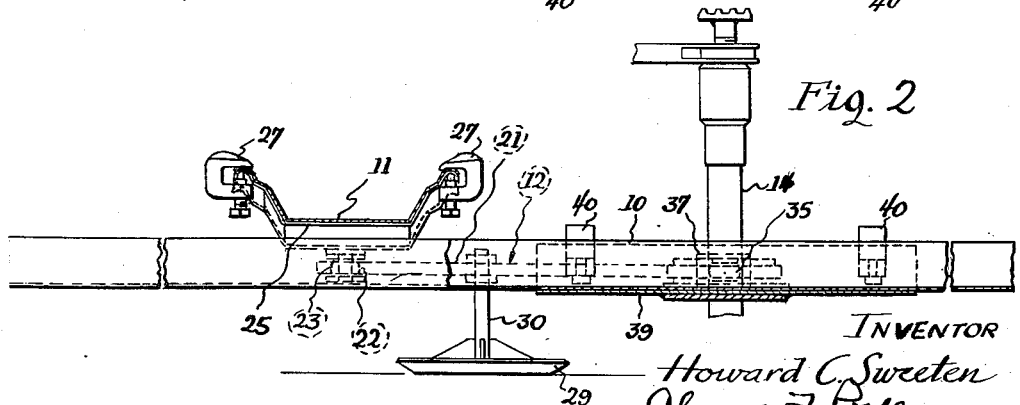

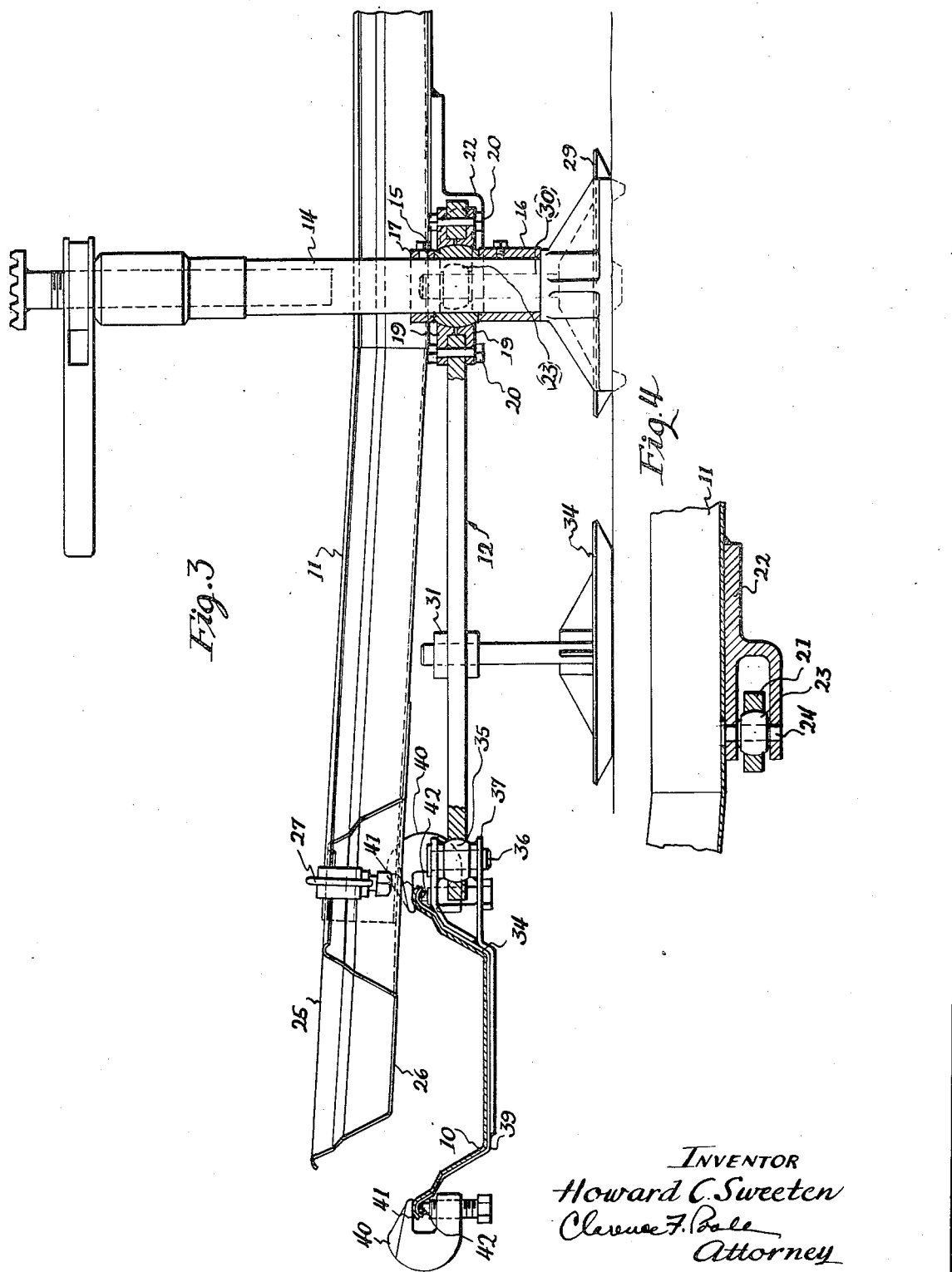

Patented Aug. 10, 1948

2,446,965

UNITED STATES PATENT OFFICE 2,446,965

ANGLE DRIVE FOR SHAKER CONVEYERS

Howard C. Sweeten, Hazard, Ky., assignor to Goodman Manufacturing Company, Chicago, Ill., a corporation of Illinois Application July 13, 1946, Serial No. 683,467

5 Claims. (Cl. 198—220)

This invention relates to improvements in angle drives for shaker conveyors.

The principal objects of my invention are to provide a new and improved angle drive of a novel and efficient construction which may be detachably connected to a shaker conveyor trough line at various positions therealong and form an efficient reciprocating drive means for driving a feeder pan arranged to discharge into the trough line, and adapted to be arranged at various angles with respect to the trough line, so said feeder pan may be used for driving crosscuts, slanting breakthroughs, room necks, etc., and load material therefrom.

A more specific object of my invention is to provide an improved form of angle drive for driving a feeder pan for a shaker conveyor trough line which may be disposed at various desired positions along the conveyor trough line and in various angular relations with respect thereto, which includes a bell crank and a simplified form of adapter for driving the bell crank from the trough line, and so formed that it may be detachably connected to the trough line at any position therealong.

These and other objects of my invention will appear from time to time as the following specification proceeds and with reference to the accompanying drawings wherein:

Figure 1 is a plan view of an angle drive constructed in accordance with my invention, shown as being connected at an intermediate portion of a shaker conveyor trough line and as driving an angle trough extending at right angles to the trough line;

Figure 2 is a fragmentary longitudinal sectional view taken through the trough line;

Figure 3 is a transverse sectional view taken substantially along line 3—3 of Figure 1; and Figure 4 is a detail sectional view showing certain details of the drive connection from the bell crank to the feeder trough.

In the drawings a shaker conveyor trough line is shown as including an intermediate trough 10. Said intermediate trough may be any trough of the trough line and said trough line may extend along an entry or into a working place of a mine, and may be reciprocably driven from a suitable shaker conveyor driving mechanism at the outby end of the trough line for moving material from the inby to the outby end of the trough line by the reciprocating action of said trough line, as is well known to those skilled in the art.

A feeder trough 11 is shown in Figure 1 as extending at right angles to the trough 10 and as being driven therefrom through a bell crank 12. Said feeder trough may be reciprocably supported above the ground to discharge into the conveyor trough line, on ball frames (not shown) or the like. Said bell crank is pivotally mounted intermediate its ends on a jack 14, adapted to be interposed between the mine floor and roof. Said jack may be of any well known form and, as herein shown, the mounting of said bell crank on said jack includes a partial-ball-shaped bearing member 15 mounted on said jack above a collar 16 and abutting the top of said collar. Said bearing is held from upward movement with respect to said jack by means of a collar 17, abutting the top of said bearing member. Said bearing member is engaged by upper and lower races 19, 19 having semi-spherical bearing surfaces, which mount said bell crank on said bearing. Said races are secured to an apertured portion of said bell crank by means of nuts and bolts 20, 20.

A lever arm 21 of the bell crank 12 is pivotally connected adjacent its end to a connecting yoke 22 secured to the bottom of the feeder trough 11 and depending therefrom. The pivotal connection between said end of said lever arm and said yoke includes a partial-ball-shaped bearing member 23. Said bearing member is mounted on a pin 24 which is mounted in said yoke at its upper and lower ends. The connection between said lever arm and said feeder trough is such that said feeder trough 11 may be moved about the axis of the pin 24 so as to extend in various angular directions with respect to the intermediate trough 10.

A discharge trough 25 having oppositely extending angular discharge ends 26, 26 abuts the underside of and is detachably clamped to the discharge end of the trough 11 by means of C-clamps 27, 27 engaging the upper outer edges of said trough. The ends of said discharge trough are inclined in opposite directions so that said trough may be connected to said feeder trough in the manner shown in Figure 1 when it is desired to pivot said feeder trough so its discharge end is disposed to the left of a line extending through the center of said trough and perpendicular to said intermediate trough and extend said trough through a slanting breakthrough or crosscut, and may be reversely connected to said feeder trough so its discharge end extends in an opposite direction when it is desired to extend said feeder trough so its discharge end is disposed to the right of said perpendicular line.

The lever arm 21 is slidably supported above the ground on a shoe 29. Said shoe is herein shown as having a shaft 30 extending upwardly therefrom through an apertured portion of said arm of said bell crank and through opposite sides of a U-clamp 31, which extends along opposite sides of said lever arm. A set screw 32 is threaded through said U-clamp and engages a side of said lever arm, to clamp said shaft to said arm. In a like manner, an arm 33 of said bell crank is slidably supported above the ground on a shoe 34.

The arm 33 has a substantially ball-shaped bearing member 35 journaled on its outer end. Said bearing member is mounted on a pin 36, mounted adjacent its upper and lower ends in a yoke 37 secured to and extending laterally from an adapter trough 39, for driving said bell crank from the trough 10. Said adapter trough is relatively short and conforms to the form of the trough 10 in cross section, and may be connected to said trough 10 or to any other of the troughs of the trough line at various positions therealong. Said adapter trough is held to the intermediate trough 10 by means of a plurality of C-clamps 40, 40. Said C-clamps are adapted to engage the tops of beads 41, 41 extending along the outer edges of the trough 10 and the undersides of beads 42, 42 extending along the outer edges of the adapter trough 39, to clamp said troughs in nested relation with respect to each other so as to reciprocably move said adapter trough with the trough 10, and reciprocably drive the bell crank 12 from said adapter trough.

It should here be noted that the position of the jack 14 may be changed as the angular position of the feeder trough 11 is changed, to cause the conveying action of the trough 11 to be substantially the same as the conveying action of the trough line, and that when the position of said jack is changed so the lever arms 21 and 33 pivot at equal angles to a line extending through the pivotal axes of the pivotal pins 24 and 36 and perpendicular to the longitudinal axis of the trough 10, the feeder trough 11 may extend parallel to the trough 10 and may be driven from various points along said trough with substantially the same conveying action as the conveying action of said trough 10. When said trough 11 is parallel to the trough 10, a suitable curved discharge trough (not shown) may be provided to discharge material from said feeder trough into the trough line.

It may be seen from the foregoing that the trough 11 may be driven from the trough 10 at various points along the conveyor trough line in a simple and efficient manner, and that said trough may be positioned in various angular positions with respect to said trough, to feed said trough when driving crosscuts or room necks extending perpendicular to the trough line and when driving breakthroughs or crosscuts at various angular positions with respect to said trough line.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. A right angle drive for a shaker conveyor including a conveyor trough line, a feeder trough adapted to discharge into said trough line, a bell crank for driving said feeder trough from said trough line, and means for detachably connecting one lever arm of said bell crank to said trough line at various desired points therealong for permitting said feeder trough to discharge into said trough line at various desired positions along said trough line including an adapter trough conforming substantially to the form of the troughs of the trough line, and clamping means for clamping said adapter trough to said trough line.

2. A right angle drive for a shaker conveyor including a conveyor trough line, a feeder trough adapted to discharge into said trough line, a bell crank for driving said feeder trough from said trough line, and means for detachably connecting one lever arm of said bell crank to a trough of said trough line at various desired points therealong for permitting said feeder trough to discharge into said trough line at various desired positions along said trough line including a short adapter trough conforming to and adapted to have a portion of a trough of the trough line nested therein, a pivotal connection between said adapter trough and said bell crank, and clamping means for clamping said adapted trough to said trough line.

3. A right angle drive for a shaker conveyor including a conveyor trough line, a feeder trough adapted to discharge into said trough line, a bell crank for driving said feeder trough from said trough line, means for detachably connecting one lever arm of said bell crank to a trough of said trough line at various desired points therealong for permitting said feeder trough to discharge into said trough line including a short adapter trough conforming to and adapted to have a portion of a trough of the trough line nested therein, a drive connection between said adapter trough and said bell crank, for driving said bell crank from said adapter trough, said adapter trough and said trough of said trough line having upper outer beaded edges adapted to have engagement with each other, and a plurality of C-clamps engaging the tops of said beaded edges of one trough of the trough line and the bottoms of said beaded edges of said adapter trough for clamping said adapter trough to be positively driven from said trough line.

4. A right angle drive for a shaker conveyor including a conveyor trough line, a feeder trough adapted to discharge into said trough line, a bell crank, means interposed between the ground and the mine roof for mounting said bell crank for pivotal movement about an upright axis intermediate its ends, a drive connection from one lever arm of said bell crank to said feeder trough permitting said feeder trough to be driven from said bell crank when in various angular positions with respect to said trough line, and means for detachably connecting the other lever arm of said bell crank to said trough line at various desired points therealong for driving said feeder trough from said trough line to discharge into said trough line including a short adapter trough conforming to and adapted to have a portion of a trough of the trough line nested therein, a pivotal connection between said adapter trough and said bell crank, and clamping means engaging said troughs and holding them in nested relation with respect to each other for clamping said adapter trough to said trough line.

5. A right angle drive for a shaker conveyor including a conveyor trough line, a feeder trough adapted to discharge into said trough line, a bell crank, means interposed between the ground and the mine roof for mounting said bell crank for pivotal movement about an upright axis intermediate its ends, a drive connection from one lever arm of said bell crank to said feeder trough permitting said feeder trough to be driven from said bell crank when in various angular positions with respect to said trough line, and means for detachably connecting the other lever arm of said bell crank to said trough line at various desired points therealong, for driving said feeder trough from said trough line to discharge into said trough line including a short adapter trough conforming to and adapted to have a portion of a trough of the trough line nested therein, said adapter trough and said trough of the trough line having upper outer beaded edges adapted to have engagement with each other, and a plurality of C-clamps engaging the tops of said beaded edges of one trough of the trough line and the bottoms of said beaded edges of said adapter trough for clamping said adapter trough to be positively driven from said trough line, and a pivotal driving connection between said adapter trough and said bell crank.

HOWARD C. SWEETEN.

REFERENCES CITED

The following references are of record in the file of this patent:

UNITED STATES PATENTS

| Number | Name | Date |
| --- | --- | --- |
| 2,270,778 | Bebinger | Jan. 20, 1942 |
| 2,314,009 | McCarthy | Mar. 16, 1943 |